US007840505B2

(12) United States Patent
Polyak et al.

(10) Patent No.: US 7,840,505 B2
(45) Date of Patent: Nov. 23, 2010

(54) CLASSIFICATION TOOL

(75) Inventors: Roman A. Polyak, Fairfax, VA (US);
Igor Griva, Fairfax, VA (US);
Shen-Shyang Ho, Pasadena, CA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 585 days.

(21) Appl. No.: 11/934,569

(22) Filed: Nov. 2, 2007

(65) Prior Publication Data
US 2008/0109389 A1    May 8, 2008

Related U.S. Application Data

(60) Provisional application No. 60/864,079, filed on Nov. 2, 2006.

(51) Int. Cl.
*G06F 15/18* (2006.01)
(52) U.S. Cl. .......................................................... 706/12
(58) Field of Classification Search .................... 706/12
See application file for complete search history.

(56) References Cited

U.S. PATENT DOCUMENTS

2007/0214013 A1*  9/2007  Silverman ....................... 705/2
2008/0109389 A1*  5/2008  Polyak et al. ................... 706/12

* cited by examiner

*Primary Examiner*—Michael Holmes
(74) *Attorney, Agent, or Firm*—David Grossman

(57) ABSTRACT

A classification system that includes a first input module, a marker module, unclassified Lagrange multiplier calculation module, and a classification module. The unclassified vector describes a physical condition. The marker module assigns a marker to the unclassified vector. The marker should place the unclassified vector into one of two classes. The unclassified Lagrange multiplier calculation module calculates a classifying Lagrange multiplier for the unclassified vector using the marker and a classification rule. The classification rule may be generated using a training system for classifying the physical condition. The classification module is configured to determine that the marker places the unclassified vector in the proper class if the classifying Lagrange multiplier is small.

25 Claims, 12 Drawing Sheets

| Dataset | Size | Dimension | NR-SVM | | Linear C-SVM | | |
|---|---|---|---|---|---|---|---|
| | | | SV | Error | C | SV | Error |
| Banana | 400 | 2 | 4.19 | 0.44 | 10 | 365.77 | 0.45 |
| Breast-Cancer | 200 | 9 | 44.70 | 0.31 | 1 | 121.26 | 0.29 |
| Diabetis | 468 | 8 | 29.04 | 0.26 | 1000 | 241.49 | 0.23 |
| German | 700 | 20 | 102.00 | 0.29 | 100 | 378.62 | 0.24 |
| Heart | 170 | 13 | 17.64 | 0.20 | 1 | 61.87 | 0.17 |
| Ringnorm | 400 | 20 | 37.08 | 0.29 | 1 | 221.86 | 0.25 |
| Splice | 1000 | 60 | 339.45 | 0.17 | 1 | 347.80 | 0.16 |
| Thyroid | 140 | 5 | 24.08 | 0.15 | 100 | 33.99 | 0.10 |
| Titanic | 150 | 3 | 35.64 | 0.24 | 1 | 68.43 | 0.23 |
| Waveform | 400 | 21 | 34.00 | 0.15 | 1 | 110.57 | 0.13 |

FIGURE 2

CLASSIFICATION TOOL

CROSS-REFERENCE TO RELATED APPLICATIONS

This application claims the benefit of U.S. Provisional Application No. 60/864,079, filed Nov. 2, 2006, entitled "Support Vector Machine via Nonlinear Rescaling Method," which is hereby incorporated by reference in its entirety.

STATEMENT REGARDING FEDERALLY SPONSORED RESEARCH OR DEVELOPMENT

This invention was made with government support under contract No. CCF-0324999 awarded by National Science Foundation. The government has certain rights in the invention.

BRIEF DESCRIPTION OF THE DRAWINGS

The following drawings describe some embodiments of the present invention.

FIG. 2 is a table that shows a comparison of NR-SVM and Linear C-SVM on ten benchmark problems.

DETAILED DESCRIPTION OF EMBODIMENTS

Figure 1:
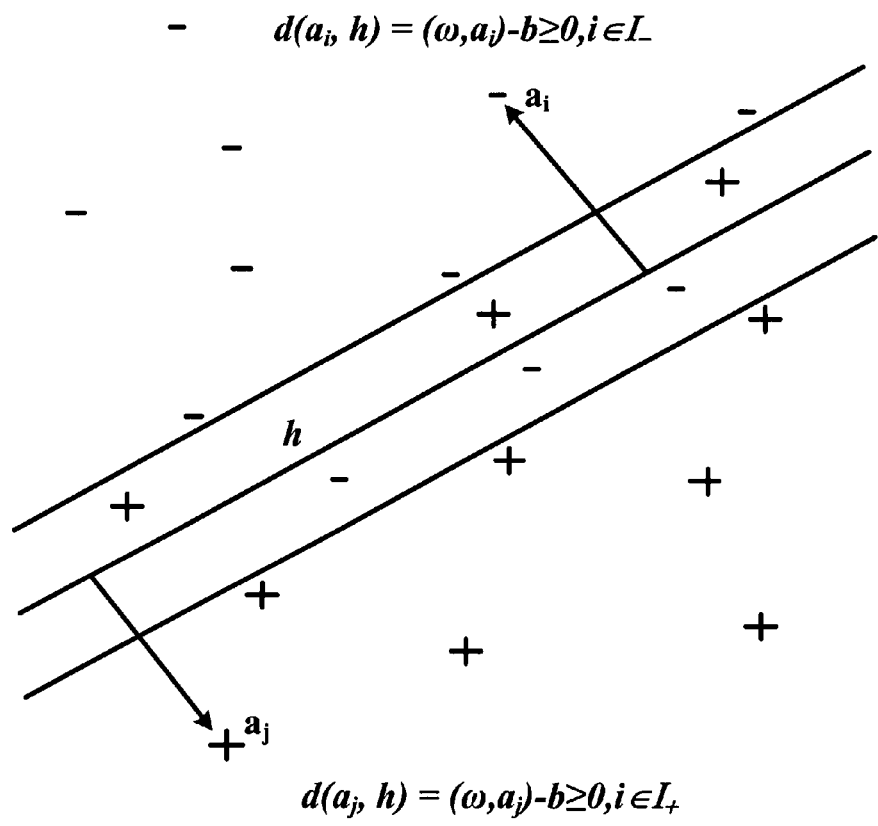
FIG. 1 shows a diagram of a non-separable case where several vectors are plotted on a multidimensional space around a hyperplane.

Embodiments of the present invention provide a mechanism for performing statistical classification. Statistical classification is a procedure in which individual items are placed into groups based on quantitative information on one or more characteristics inherent in the items (referred to as traits, variables, characters, etc) and based on training sets of previously labeled items. A training set may consist of a multitude of input vectors and associated answer vectors and is generally used together with a supervised learning method to train a knowledge database.

Statistical classification mechanisms are typically used in pattern recognition systems. Many other useful applications for statistical classification mechanisms include: computer vision, medical imaging and medical image analysis, optical character recognition, geostatistics, speech recognition, handwriting recognition, biometric identification, natural language processing, document classification, data search engines, internet search engines, credit scoring, and the like.

Another application for embodiments of the present invention includes medical diagnostics and discovery. For example, one could collect medical data from a multitude of sick people which are coming to one or more medical offices. Each of the patients may be characterized medically with a multidimensional vector. The vector may include a multitude of labeled data points that represents medical information about a patient such as blood values, sugar, temperature and other diagnostic data. Embodiments of the present invention may be used to diagnose medical conditions from such a vector. For example, a patient may have a condition that is believed to be some kind of lung condition such as pneumonia or lung cancer. Some symptoms for these conditions may be similar and some symptoms may be different. These conditions may be characterized at least in part using embodiments of the disclosed statistical classification mechanisms.

Assuming that there are a large number of multidimensional vectors with some of the vectors believed to represent people with pneumonia and some of the vectors believed to represent people with lung cancer. Each vector corresponds to a constraint. These vectors may be separated into two groups, one group for vectors that represent people with pneumonia and another group that represent people with lung cancer. The two groups (sometimes referred to as data classes) of these multidimensional vectors may be mapped onto two sides of a hyperplane defined by a support vector, one side for pneumonia vectors and one side for the lung cancer vectors. The hyperplane is a decision surface in feature space intended to separate the two groups. Even though some vectors (cases) may be difficult to separate, ideally, there is a comfortable margin between the vectors and the hyperplane. Then, one can be almost certain that when a new case comes up and is plugged into the data set of available vectors, that the new data may be positioned on a proper side of the hyperplane.

Each of the vectors is a constraint. For example in FIG. 1, vectors are mapped onto the graph as plusses and minuses. Even when it is clear that there is no way to separate the minuses and plusses, one can still draw a line that so that most of the pluses are on one side and most of the minuses are on the other side. Then they can be separated. What has happened in the classical support vector is that a margin may be built with each vector (plus or minus) becoming a constraint of the optimization problem.

A Lagrange multiplier may be associated with each vector. The vectors that are outside this margin, the Lagrange multipliers typically have a value of zero. For the vectors that are inside the margin, the Lagrange multipliers typically have a value more than zero. The present embodiments add new information to the graph. If a new case (vector) is placed on the plus side, and solve the problem optimized again, then the value of the Lagrange multiplier for the new vector should reflect the correctness of the placement. For example, a vector is obtained for a new patient who has lung cancer, but the vector is placed on the pneumonia side of the hyperplane, the Lagrange multiplier associated with that vector should end up having a large value. This indicates that the vector was misplaced. However, if the same vector is placed on the lung cancer side of the hyperplane, then the Lagrange multiplier should be small. In other words, the value of the Lagrange multiplier should indicate the correctness of the vector placement.

An important part of the Non-Rescaling Support Vector Machine (NRSVM) is the DOUBLE CONFORMATION Rule (DCR). The NRSVM allows establishing the DCR for classification problems due to the presents of the Lagrange multipliers associated with each vector of the data set. Every new case which requires classification may be used twice in the NRSVM. The Lagrange multipliers associated with such a case show not only that the case belongs to a particular class, it also confirms that the case does not belong to the alternative class.

As noted above, the support vector is used to define the hyperplane. A marker may be used to indicate the location of each of the vectors in the training set in the multidimensional space. The number of support vectors may be reduced by eliminating vectors that make little contribution to the support vector. When a new case is received, the new vector may be placed on one side of the hyperplane and the value of the Lagrange multiplier examined. If the Lagrange multiplier is large, then the vector is assumed to be misplaced. In this case, the vector may be moved to the other side of the hyperplane. The Lagrange multiplier should now be small.

The embodiments use a construction of a linear support vector machine (SVM) based on nonlinear resealing (NR) methodology (see [11, 14, 12]). The formulation of the linear SVM based on the NR method leads to an algorithm which reduces the number of support vectors without compromising the classification performance compared to the linear soft-margin SVM formulation. The NR algorithm computes both the primal and the dual approximation at each step. The dual variables associated with the given data-set provide important information about each data point and play the key role in selecting the set of support vectors. Experimental results on ten benchmark classification problems show that the NR formulation is feasible. The quality of discrimination, in most instances, is comparable to the linear soft-margin SVM while the number of support vectors in several instances were substantially reduced.

In the past decade, the Support Vector Machine (SVM) [16] was among the most widely used tools in statistical learning. Both the primal and dual SVM formulations lead to solving quadratic programming (QP) problems in order to find a separating hyperplane. The normal vector of the separating hyperplane w is conveniently represented as a linear combination of the support vectors [16]. The reduction of the support vectors in this representation can lead to the reduction of classification time and therefore highly desirable [3, 10, 17]. When the given binary-class data-set can be separated, solving a QP problem finds a hyperplane (hyper-surface) that separates the two classes with maximum margin [2]. In the non-separable case, there is a trade-off between the margin size and the number of data points in the data-set which cannot be separated. In the case of the standard soft-margin SVM formulation, the Lagrange multipliers (dual variables) corresponding to the data points inside the margin may have a fixed value which is equal to a penalty parameter [5]. All the data points within the margin may be support vectors. They may all have the same Lagrange multipliers in the representation of the normal vector of the separating hyperplane equal to the a priori given penalty parameter. It leads to a large number of support vectors and may thus compromise the scarcity of the representation of w. Several methods have been suggested to reduce the number of support vectors [3, 10, 17]. However, these approaches are still based on the soft-margin SVM and therefore include the upper bounds on the dual variables in the formulations, a restrictive factor for finding a sparse representation of w.

A contribution of the presently disclosed embodiments is the nonlinear resealing (NR) formulation of the SVM that substantially reduced the number of support vectors without compromising the quality of discrimination. Moreover, this formulation does not require a pre-defined penalty parameter, which is a critical factor in the soft-margin SVM formulation. When the classification problem is separable, the solution from the NR formulation may be identical to the optimal margin SVM.

The distinct characteristic of the NR theory [11, 14] is the use of Lagrange multipliers as the main driving force which ensures the convergence of NR methods for solving constrained optimization problems. The positive scaling parameter can be either fixed or increased from step to step. By increasing the scaling parameter, one can improve the rate of convergence. The fundamental difference between NR methods and the interior point methods [9] is that the NR methods do not require finding an interior starting point and they do not keep the primal sequence inside the feasible set. Moreover, the NR methods are exterior point methods by nature in which the Lagrange multipliers carry important information throughout the computational process.

In the NR formulation of SVM, the Lagrange multipliers characterize the "cost" of the "non-separability." The "large" Lagrange multipliers that stand out among all the Lagrange multipliers correspond to the data points that are "most certain" on the "wrong side" of the separating hyperplane. In fact, sometimes one can consider such data points as "noise" which have to be eliminated from the input data [6]. On the other hand, the "small" Lagrange multipliers identify the data points which have practically no impact on the separating hyperplane. They can also be eliminated. To this end, the Lagrange multipliers enable one to identify the data points which are critical in defining the discrimination rule and at the same time to reduce substantially the number of support vectors. The experimental results show that in most cases the SVM based on the NR method (NR-SVM) reduces the number of support vectors substantially without compromising the quality of discrimination compared to the linear soft-margin SVM.

This disclosure is organized as follows. In the next section, the basic SVM problem is reviewed and shown that due to the problem formulation the Lagrange multipliers for all the data points which cannot be separated have the same value equal to the a priori chosen penalty parameter. Next, the NR method is described and the basic convergence results reviewed. The SVM formulation based on NR theory is then introduced and the NR method applied to solve the SVM problem. The performance of NR-SVM is then compared with the linear soft-margin SVM on ten benchmark problems.

For a given set of labeled data points $\{(a_1, y_1), \ldots, (a_n, y_n)\}$ where $y_i \in \{-1, 1\}$ and $a_i \in \Re^m$, the soft-margin SVM problem [16] consists of finding the triple $(w^*, \xi^*, b^*) \in \Re^m \times \Re^n \times \Re$ that minimizes $$u = \frac{1}{2}\|w\|^2 + C\sum_{i=1}^{n} \xi_i \qquad (1)$$

subject to the constraints $$y_i(w \cdot a_i + b) \geq 1 - \xi_i, \xi_i \geq 0, i=1,2,\ldots,n \qquad (2)$$

where w is the normal vector for the "separating" hyperplane, $(w,x)+b=0$, the vector $\xi=(\xi_1, \ldots, \xi_n)$ defines the constraints violation and $C>0$ is an empirically defined penalty parameter, which is used to penalize the constraint violations.

Very often instead of (1)-(2) the dual problem [16] is used. The dual QP consists of maximizing $$v = -\frac{1}{2}\sum_{i=1}^{n}\sum_{j=1}^{n} y_i y_j \alpha_i \alpha_j (a_i \cdot a_j) + \sum_{i=1}^{n} \alpha_i \quad (3)$$

subject to $$\sum_{i=1}^{n} y_i \alpha_i = 0, \quad (4)$$

$$0 \leq a_i \leq C, \, i=1,\ldots,n. \quad (5)$$

From the primal solution $(w^*, \xi^*, b^*)$ and the dual solution $a^* = (a_1^*, \ldots, a_n^*)$, we have $$u^* = v^*, \quad (6)$$

and the following complementary conditions are satisfied $$\xi_i^* > 0 \Rightarrow a_i^* = C,$$
$$\xi_i^* = 0 \Leftarrow 0 \leq a_i^* < C, \quad (7)$$

and $$w^* = \sum_{i=1}^{n} \alpha_i^* y_i a_i. \quad (8)$$

For the data points on the margin, the corresponding components in the dual vector $a^* = (a_1^*, \ldots, a_n^*)$ are between 0 and C. The dual values of the data points outside the margin are zero. It follows from (7) that all non-separable (i.e. within the margin) data points have the same dual value, which is equal to the a priori chosen penalty parameter C. In other words, all Lagrange multipliers in the representation (8) which correspond to the data points within the margin have the same C value.

In the next section, the general NR methods are described and then a NR approach for the SVM is described which does not require an a priori chosen penalty parameter C. It should be emphasized that the NR method converges for any fixed scaling parameter k>0 due to the Lagrange multipliers update [7, 14]. Therefore there may not be a need to predefine the penalty parameter. The Lagrange multipliers characterize the "cost" of the constraint violation. At each step the Lagrange multipliers should provide extra information about the non-separability of the data points and at the same time indicate the data points that do not affect the discrimination rule and can be eliminated.

The Nonlinear Rescaling Method will now be discussed. Let $-\infty < t_0 < 0 < t_1 < \infty$. Consider a class $\Psi$ of twice continuously differentiable functions $\psi: (t_0, t_1) \to \Re$, which satisfy the following properties:

$\psi(0)=0, \psi'(0)=1;$
$\psi'(t)>0;$
$\psi''(t)<0.$

The function $\psi \in \Psi$ may be used to transform the constraints of a given constrained optimization problem into an equivalent set of constraints.

Let $f: \Re^m \to \Re$ be convex, and $c_i: \Re^m \to \Re$, $i=1, \ldots, n$ be concave functions. Consider the following convex optimization problem $$x^* \in X^* = Arg \min\{f(x) | x \in \Omega\} \quad (9)$$

where $\Omega = \{x \in \Re^m : c_i(x) \geq 0, i=1, \ldots, n\}$.

It follows from properties 1.-3. that for any given scaling parameter k>0, that $$\Omega = \{x : k^{-1}\psi(kc_i(x)) \geq 0, i=1, \ldots, n\}$$

Therefore, for any k>0, the following problem $$x^* \in X^* = Arg \min\{f(x) | k^{-1}\psi(kc_i(x)) \geq 0, i=1, \ldots, n\} \quad (10)$$

Should be equivalent to the original convex optimization problem (9).

The classical Lagrangian $\mathcal{L}: \Re^m \times \Re_+^n \times \Re_{++} \to \Re$ $$\mathcal{L}(x, \lambda, k) = f(x) - k^{-1} \sum_{i=1}^{n} \lambda_i \psi(kc_i(x)), \quad (11)$$

which corresponds to problem (10) can be a main tool in developing NR methods for solving the constrained optimization problem.

In experiments, the shifted logarithmic barrier function $\psi(t)=\ln(t+1)$ is used, which leads to the modified barrier functions theory and methods [11]. Each step of the NR method alternates finding an unconstrained minimizer of $\mathcal{L}:(x,\lambda,k)$ in $\Re^m$ and the Lagrange multipliers update. The scaling parameter can be fixed or one can change k at each iteration. Consider the version of the NR method with a fixed scaling parameter.

Let $\lambda^0 \in \Re_{++}^n$ be the initial Lagrange multiplier vector and the positive scaling parameter k is fixed. Assume that the primal-dual pair $x^s, \lambda^s \in \Re^m \times \Re_{++}^n$ has been found already. One step of NR method consists of finding:

$$x^{s+1} : \nabla_x \mathcal{L}(x^{s+1}, \lambda^s, k) = \nabla f(x^{s+1}) - \sum_{i=1}^{n} \psi'(kc_i(x^{s+1}))\lambda_i^s \nabla c_i(x^{s+1}) = 0 \quad (12)$$

and updating the Lagrange multipliers by the formula:

$$\lambda_i^{s+1} = \psi'(kc_i(x^{s+1}))\lambda_i^s, \, i=1, \ldots, n. \quad (13)$$

From (12)-(13), one has $$\nabla_x \mathcal{L}:(x^{s+1}, \lambda^s, k) = \nabla_x L(x^{s+1}, \lambda^{s+1}) = 0 \quad (14)$$

where $L(x,\lambda) = f(x) - \Sigma \lambda_i c_i(x)$ is the classical Lagrangian for the original problem (9).

Therefore, $$x^{s+1} = arg\min\{L(x, \lambda^{s+1}) | x \in \Re^m\}$$

and $$d(\lambda^{s+1}) = L(x^{s+1}, \lambda^{s+1})$$

where $d(\lambda) = \inf_{x \in \Re^m} L(x, \lambda)$ is the dual function.

The NR method (12)-(13) solves simultaneously the primal problem (9) and the following dual problem $$d(\lambda^*) = \arg\max\{d(\lambda) | \lambda \in \mathfrak{R}_+^n\}. \tag{15}$$

The following theorems establish the convergence properties of the NR method (12)-(13).

Theorem 1 [11] If the standard second order optimality conditions are satisfied and $f, c_i, i=1, \ldots, n$ are smooth enough then there is $k_0 > 0$ large enough that for any $k \geq k_0$, the following bounds hold a) $\|x^{s+1} - x^*\| \leq ck^{-1}\|\lambda^s - \lambda^*\|$ b) $\|\lambda^{s+1} - \lambda^*\| \leq ck^{-1}\|\lambda^s - \lambda^*\|$ \hfill (16)

and the constant $c > 0$ is independent of k.

Theorem 2 [14] If (10) is a convex programming problem, Slater's conditions are satisfied and $X^*$ is a bounded set, then for any $k > 0$ the NR method (12)-(13) generates the primal-dual sequence $\{x^s, \lambda^s\}$ such that:

1. $\lim_{s \to \infty} \lambda^s = \lambda^*$,

2. $\lim_{s \to \infty} f(x^s) = \lim_{s \to \infty} d(\lambda^s) = f(x^*) = d(\lambda^*)$, 3. for any converging subsequence $\{x^{s_e}\}$, $$\lim_{s_e \to \infty} x^{s_e} = x^* \in X^*.$$

The NR method (12)-(13) requires finding an unconstrained minimizer $x^{s+1}$ of $\mathcal{L}(x, \lambda^s, k)$ at each step which is generally speaking an infinite procedure. To make the NR method (12)-(13) practical the minimizer $x^{s+1}$ may be replaced by its approximation $\bar{x}^{s+1}$, which one can find using the stopping criterion introduced in [11]. The approximation $\bar{x}^{s+1}$ may be found in finite number of Newton's steps applied for minimization of $\mathcal{L}(x, \lambda^s, k)$ in x. Replacing $x^{s+1}$ by $\bar{x}^{s+1}$ should not compromise both the convergence and the rate of convergence of the NR method.

In the next section, the NR formulation for the SVM is introduced and an NR method for solving the SVM problem is described.

The Nonlinear Rescaling SVM (NR-SVM) Formulation will now be described. For a given set of labeled data points $\{(a_i, y_i) \in \mathfrak{R}^{m+1}\}, i \in I = \{1, \ldots, n\}, y_i \in \{-1, 1\}$, to construct a SVM means to find a hyperplane $h = h(w, b) = \{x: (w, x) - b = 0\}$ such that the sets $I_+ = \{i: (a_i, 1)\}$ and $I_- = \{i: (a_i, -1)\}$ will be separated with a maximum margin.

For every $i \in I_+$ in the "positive" halfspace, consider the distance $d(a_i, h) = (w, a_i) - b \geq 0$ from $a_i, i \in I_+$ to the hyperplane h and for every $i \in I_-$ in the "negative" halfspace, consider the distance $d(a_i, h) = -(w, a_i) + b \geq 0, i \in I_-$. To find the hyperplane h, which separates set $I_+$ from $I_-$ with maximum margin, one may solve the following problem:

$$\Delta^* = \max_{\|w\|^2 = 1, b \in \mathfrak{R}} \min_{i \in I} d(a_i, h).$$

By introducing $\Delta = \min_{i \in I} d(a_i, h)$, one can rewrite the problem of finding $\Delta^*$ as follows:

$$\Delta \to \max \tag{17}$$

subject to $$c_i(x) \equiv c_i(w, b, \Delta) = (w, a_i) - b - \Delta \geq 0, i \in I_+ \tag{18}$$

$$c_i(x) \equiv c_i(w, b, \Delta) = -(w, a_i) + b - \Delta \geq 0, i \in I_- \tag{19}$$

$$\|w\|^2 = 1 \tag{20}$$

where $I_+$ and $I_-$ consist of positively and negatively labeled data points respectively.

To describe the NR method for solving the problem (17)-(20), consider an equivalent problem. For any given positive parameters $k > 0, \tau > 0$ and a transformation $\psi \in \Psi$, the following problem:

$$-\tau \Delta \to \min \tag{21}$$

subject to $$k^{-1} \psi(\cdot) = k^{-1} \psi(kc_i(x)) \geq 0, i \in I_+ \tag{22}$$

$$k^{-1} \psi(\cdot) = k^{-1} \psi(kc_i(x)) \geq 0, i \in I_- \tag{23}$$

$$\frac{1}{2}(\|w\|^2 - 1) = 0 \tag{24}$$

is equivalent to (17)-(20).

The classical Lagrangian $$\mathcal{L}(\cdot) = \mathcal{L}(w, b, \Delta, \lambda, \gamma, \tau) \tag{25}$$
$$= -\tau \Delta - k^{-1} \sum_{i \in I_+} \lambda_i \psi(kc_i(x)) - k^{-1} \sum_{i \in I_-} \lambda_i \psi(kc_i(x)) +$$
$$\gamma \frac{1}{2}(\|w\|^2 - 1)$$

for the problem (21)-(24) may be used as the basic tool. The Lagrangian $\mathcal{L}(\cdot)$ may be used to describe the NR-SVM.

The NR method for solving the problem (21)-(24) consists of finding the minimum of the Lagrangian (25) for the equivalent problem in $x = (w, b, \Delta)$, and then updating the Lagrange multipliers $\lambda = (\lambda_1, \ldots, \lambda_n)$ and $\tau$. The scaling parameter k may be fixed or updated at any iteration. Let $\epsilon > 0$ be small enough. One step of the NR method for solving (21)-(24) given a fixed positive scaling parameter k will now be described.

1. Find $$\hat{x} = \arg\min\{\mathcal{L}(x, \lambda, \gamma, \tau, k) | x \in \mathfrak{R}^{n+2}\} \tag{26}$$

which is equivalent to solving the following system of equations:

$$\nabla_w \mathcal{L}(\cdot) = -\Sigma_{i \in I_+} \lambda_i \psi'(\cdot) a_i + \Sigma_{i \in I_-} \lambda_i \psi'(\cdot) a_i + \gamma w = 0 \tag{27}$$

$$\nabla_\Delta \mathcal{L}(\cdot) = -\tau + \Sigma_{i \in I_+} \lambda_i \psi'(\cdot) + \Sigma_{i \in I_-} \lambda_i \psi'(\cdot) = 0 \tag{28}$$

$$\nabla_b \mathcal{L}(\cdot) = \Sigma_{i \in I_+} \lambda_i \psi'(\cdot) - \Sigma_{i \in I_-} \lambda_i \psi'(\cdot) = 0 \tag{29}$$

2. Update the Lagrange multipliers by the formula:

$$\hat{\lambda}_i = \lambda_i \psi'(\cdot), i \in I_+ \cup I_- \tag{30}$$

3. Find $\hat{\gamma}$ from $\|\hat{w}\|^2 = 1$ where $$\hat{w} = \gamma^{-1}(\Sigma_{i \in I_+} \hat{\lambda}_i a_i - \Sigma_{i \in I_-} \hat{\lambda}_i a_i) \tag{31}$$

4. Compute $$\hat{\tau} = \Sigma_{i \in I_+} \hat{\lambda}_i + \Sigma_{i \in I_-} \hat{\lambda}_i \tag{32}$$

5. Set $$\hat{\lambda} := (\hat{\lambda}_i \hat{\tau}^{-1}, i = 1, \ldots, n) \tag{33}$$

6. If $\|\lambda-\hat{\lambda}\|>\epsilon$, then set $(x,\lambda,\gamma,\tau):=(\hat{x},\hat{\lambda},\hat{\gamma},\hat{\tau})$ and go to step 1. Else $x^*=x, \lambda^*=\lambda$.

Use the Lagrange multipliers $\lambda^* \in \Re^r$ to select the support vectors by eliminating vector $a_i$ when $0<\lambda_i \leq \epsilon$. The NR method (26)-(33) is the basis for the NR-SVM algorithm.

Notice that if the training set I is such that the subsets $(a_i, y_i), i \in I_-$ and $(a_i, y_i), i \in I_+$ can be separated, then it follows from the formulation (17)-(20) that $\Delta^*>0$ and the maximal margin is $2\Delta^*$. The discriminating rule is identical to the classical SVM.

If the subsets $(a_i, y_i), i \in I_-$ and $(a_i, y_i), i \in I_+$ cannot be separated, then $\Delta^*<0$.

In such case the classical SVM allows finding a hyperplane, which partially "separates" the sets $I_+$ and $I_-$ (see FIG. 2) and all vectors within the margin will have the same Lagrange multipliers $\lambda_i = C > 0$. The NR-SVM formulation provides a particular Lagrange multiplier for each vector. Moreover, $\lim_{s \to \infty} \lambda^s = \lambda^x$. Therefore, the Lagrange multipliers $\lambda_i^s \to 0$ can be eliminated.

A few comments on the computational complexity of both the soft-margin SVM and the NR approach will now be made. The soft-margin SVM solves a quadratic programming problem. If based on the interior-point method, the soft-margin SVM may have a polynomial computational complexity $\mathcal{O}(\sqrt{m} \log \epsilon^{-1})$, where $\epsilon$ is the accuracy of the solution. The complexity of the NR algorithm for the quadratic problem depends on the properties of the problem at the solution. It can be as worse as $\mathcal{O}(\sqrt{m} \log^2 \epsilon^{-1})$ and as good as $\mathcal{O}(\log \epsilon^{-1})$, where $\epsilon$ is the accuracy of the solution. More details on the complexity of the NR algorithms are discussed in [8, 13].

Experimental Results will now be discussed. Experiments were performed to compare embodiments of the NR-SVM and the linear soft-margin SVM in terms of the reduction in the number of support vectors and the classification error. The Matlab interface of LIBSVM 2.81 [4] was used for the SVM implementation (C-SVM) with C taking the values: 1, 10, 100, and 1000, without kernels, i.e. linear SVM. NR-SVM performance is compared with the best performance of linear C-SVM using the various C values. To evaluate and compare the performance of an NR-SVM embodiment with the linear C-SVM, a ten binary classification problems from [15] based on the data-sets from [1] are used. For each benchmark problem, there are 100 realizations each.

The experimental results are shown in FIG. 2. The quality of discrimination (based on the test error rate), in most instances, is comparable to the linear C-SVM while the number of support vectors in several instances were substantially reduced. Similar to these experimental results, it has been observed in [10, 17] that a reduction in the number of support vectors increases the test error rate slightly.

Comparison of NR-SVM and Linear C-SVM on ten benchmark problems. (SV (Number of support vectors) and Error (Number of testing examples wrongly classified/Number of testing examples) are averaged over 100 trials.)

This disclosure constructs embodiments of a linear support vector machine (SVM) based on the NR methodology. The formulation of the NR-SVM leads to a mechanism which reduces the number of support vectors without compromising the classification performance compared to the linear soft-margin SVM formulation. In particular, the NR-SVM does not require a predefined penalty parameter. One notes that vectors which have very small Lagrange multipliers, can be removed at each NR step to improve the computational efficiency. Moreover, when a vector point has a much higher Lagrange multiplier, one can suspect that either the vector point is "noise" or it is wrongly labeled.

The distinct characteristics of the NR method is the ability to associate with each vector point a Lagrange multiplier, which measures the "non-separability" of this vector point. It allows the use of the SVM approach for medical diagnostic and drug discovery purposes. In particular, when it comes to medical diagnostics, the given vector points may be used together with the vector point that represents a new medical case. One may assign a positive label to the new vector point and solves the NR-SVM. Then may then solve the NR-SVM again when the vector point is assigned with a negative label. In the case when the Lagrange multipliers of this new vector point are substantially different for the two labels, for example "very small" value for positive label and "very large" value for negative label, then one has a double conformation that the medical case under consideration belongs to the positive set.

Figure 3:
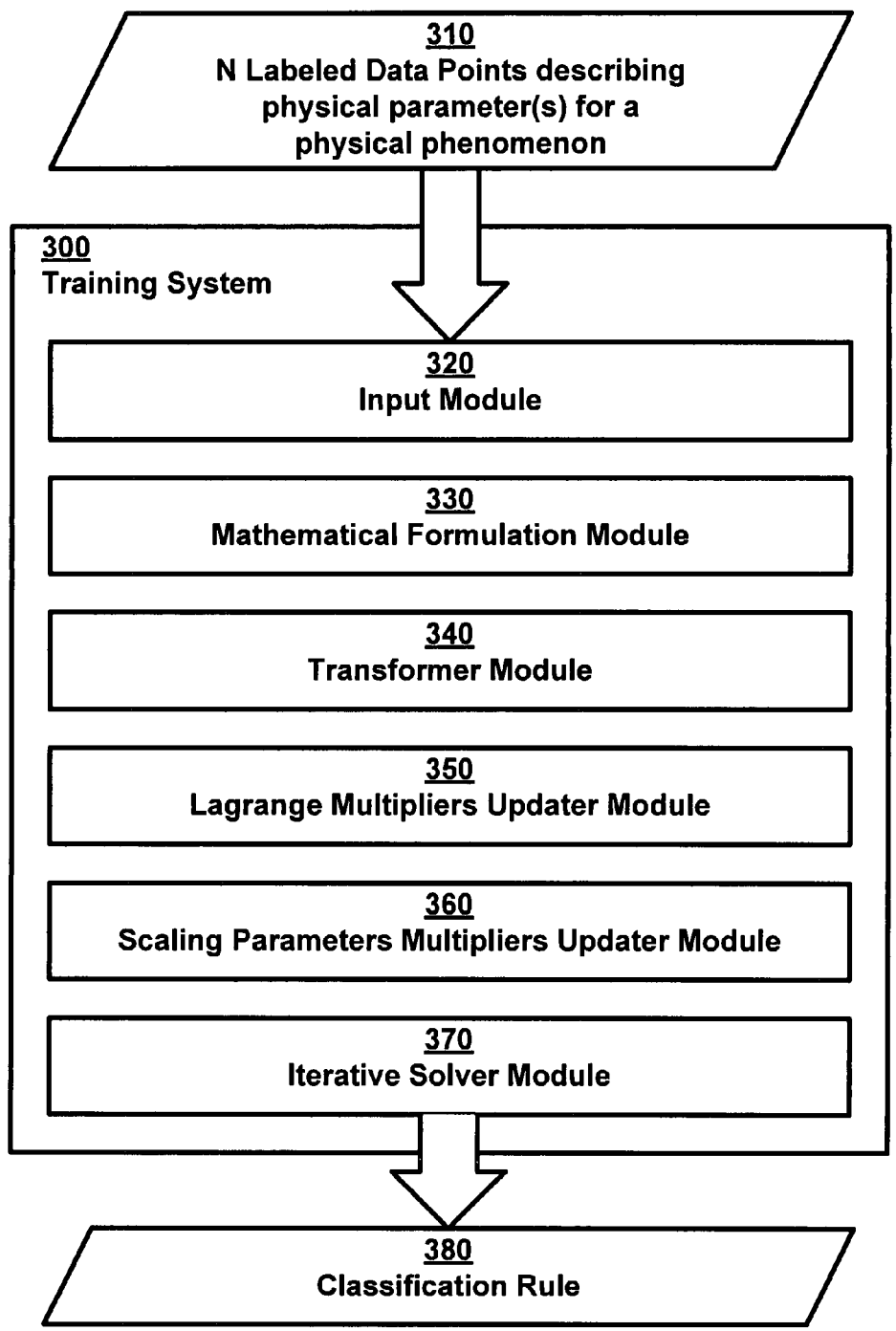
FIG. 3 is a block diagram of a training system as per an aspect of an embodiment of the present invention.

FIG. 3 is a block diagram of a training system 300 as per an aspect of an embodiment of the present invention. The training system 300 may be used to generate a classification rule 380 that may later be used to classify a physical condition described by an unclassified vector 1010. An unclassified vector 1010 may include a multitude of labeled data points that represent values for a series of variables. Some of the values may be the result of a real world physically measurement. For example, the unclassified vector 1010 may comprise medical data about a patient and the classification rule 380 may be used to determine if the unclassified vector 1010 is describing a person with a particular medical condition.

Embodiments of the training system 300 may include an input module 320, a mathematical formation module 330, a transformer module 340, a Lagrange multipliers updater module 350, a scaling parameters multipliers updater module 360, and an iterative solver module 370. The input module 320 is preferably configured to receive n labeled data points 310 $\{(a_1, y_1), \ldots, (a_n, y_n)\}$. At least one of the n labeled data points 310 may describe a physical parameter for a physical phenomenon. The n labeled data points 310 may include vectors $a_i \in \Re^m$ and markers $y_i \in \{-1, 1\}$ with each of the n labeled data points 310 placed in one of two sets $I_+=\{i:(a_i,1)\}$ and $I_-=\{i:(a_i,-1)\}$.

It is envisioned that embodiments may be built many different ways. For instance, the various modules described in this disclosure may exist separately or in combination, either physically or logically. In this context, the term module means a self-contained component of a system, capable of interfacing with other components. In particular, it is anticipated that embodiments of the present invention may be constructed using software or hardware. Additionally, it is reasonable that modules identified in this disclosure may be created using other modules. Module(s) may actually be a self contained program(s) or series of programs that may reside on one or more computers. Computers in this disclosure may be a general purpose computer, an application specific computer, an application appliance, a server or the like. When the modules reside on multiple separate computers, those computers may be part of a bank of related computers or be a collection of independent computers. It is even possible that some modules may reside on multiple computers that are configured to communicate through a network. The modules may be stored on a tangible computer readable medium as a series of processor executable instructions that when executed by one or more processors, performs their useful function. Similarly, a module may be constructed using hardware such as an ASIC, an FPGA, or discrete hardware. This may be useful in some instances to provide fast processing.

Figure 4:
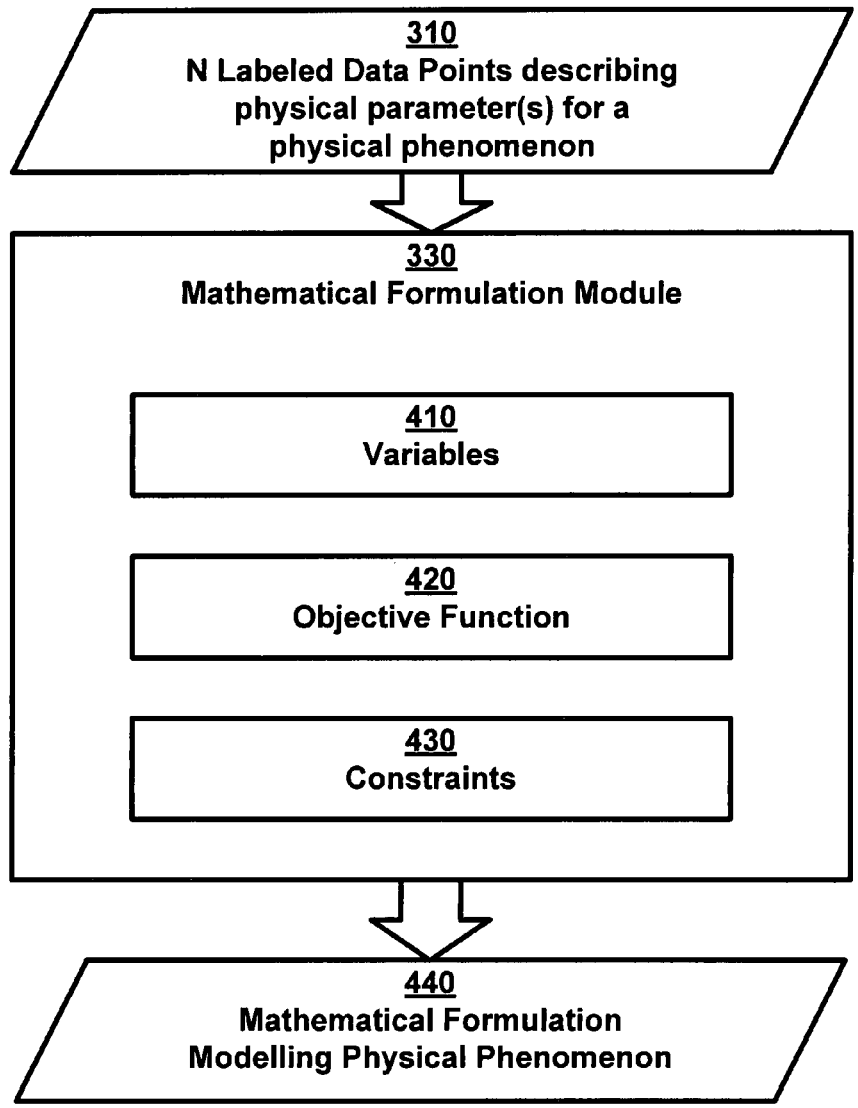
FIG. 4 is a block diagram of a mathematical formulation module as per an aspect of an embodiment of the present invention.

FIG. 4 is a block diagram of a mathematical formulation module 330 as per an aspect of an embodiment of the present invention. The mathematical formulation module 330 is preferably configured to use the n labeled data points 310 to model the physical phenomenon as a mathematical formulation 440. The mathematical formulation 440 may include: variables 410 x=(w,b,Δ), where w ∈ $\Re^m$, b ∈ $\Re^1$, Δ ∈ $\Re^1$; an objective function 420 $f(x)=\Delta$; and a plurality of constraints 430. The plurality of constraints 430 may include: $c_i(x) \equiv c_i(w, b, \Delta) = (w, a_i) - b - \Delta \geq 0, i \in I_+$; $c_i(x) \equiv c_i(w, b, \Delta) = -(w, a_i) + b - \Delta \geq 0$, $i \in I_-$ and $\|w\|^2 = 1$. The mathematical formulation 440 may include an optimized version of the objective function 420, with the optimization subject to at least the plurality of constraints.

Figure 5:
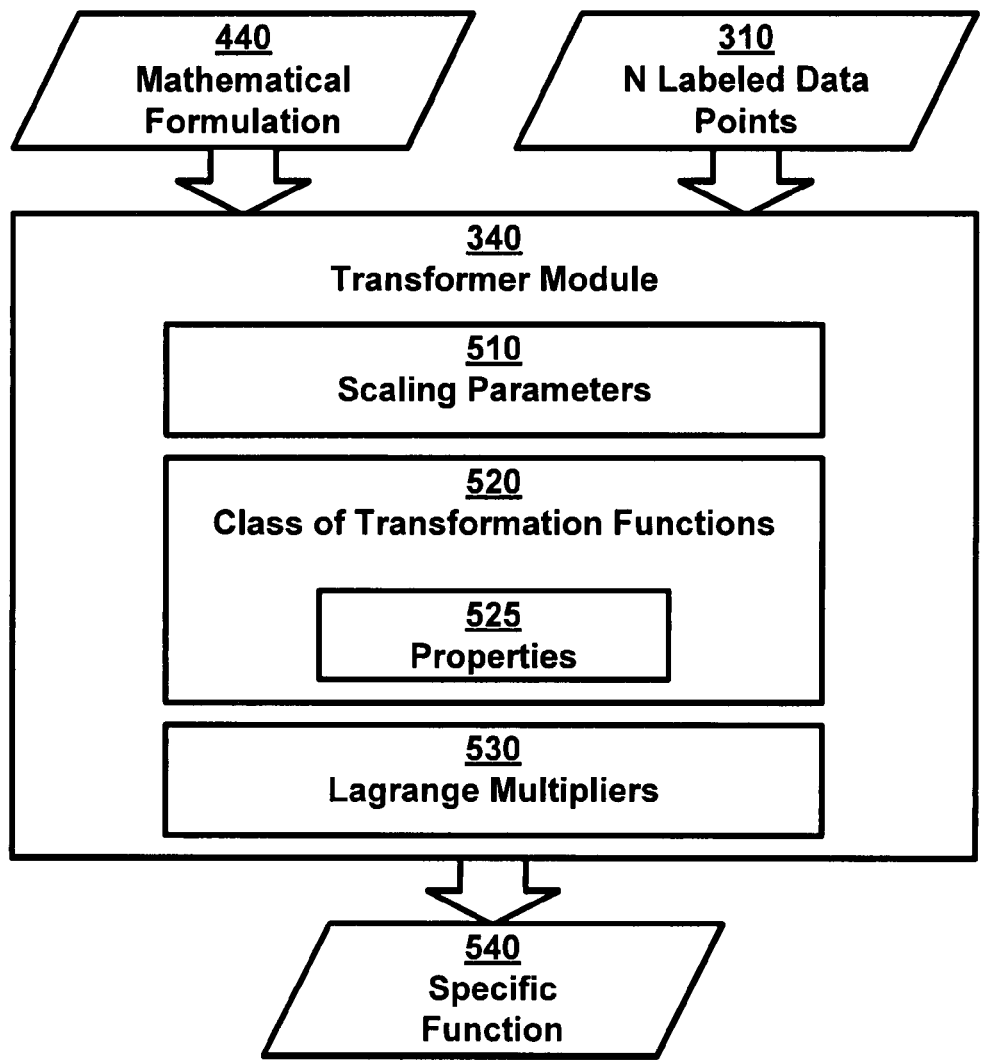
FIG. 5 is a block diagram of a transformer module as per an aspect of an embodiment of the present invention.

FIG. 5 is a block diagram of a transformer module 340 as per an aspect of an embodiment of the present invention. The transformer module 340 is preferably configured to build a specific function 540 L(w,b,Δ,λ,γ,τ) using: the mathematical formulation 440; Lagrange multipliers 530 $\lambda=(\lambda_1, \ldots, \lambda_n)$; scaling parameters 510 γ, τ, k; a class of transformation functions 520 with a predefined set of properties 525; and the n labeled data points 310. The predefined set of properties 525 may include: $\psi(t): \Re^1 \to \Re^1$ defined on $-\infty \leq a < t < b \leq \infty$; $\psi(0) = 0$; $\psi'(0) = 1$; $\psi'(t) > 0$; $\psi''(t) < 0$; and $$\lim_{t \to b} \psi'(t) = 0.$$

Additionally, the predefined set of properties 525 may also include: $\psi'''(t) > 0$ and $$\lim_{t \to a} \psi'(t) = 0.$$

The n labeled data points 310 may further include a nonlinear rescaling part. The nonlinear rescaling part may include at least:

$$k^{-1} \sum_{i \in I_+} \lambda_i \psi(kc_i(x)); \text{ or } k^{-1} \sum_{i \in I_-} \lambda_i \psi(kc_i(x)).$$

The specific function may include:

$$-\tau\Delta - k^{-1} \sum_{i \in I_+} \lambda_i \psi(kc_i(x)) - k^{-1} \sum_{i \in I_-} \lambda_i \psi(kc_i(x)) + \gamma \frac{1}{2} (\|w\|^2 - 1).$$

Figure 6:
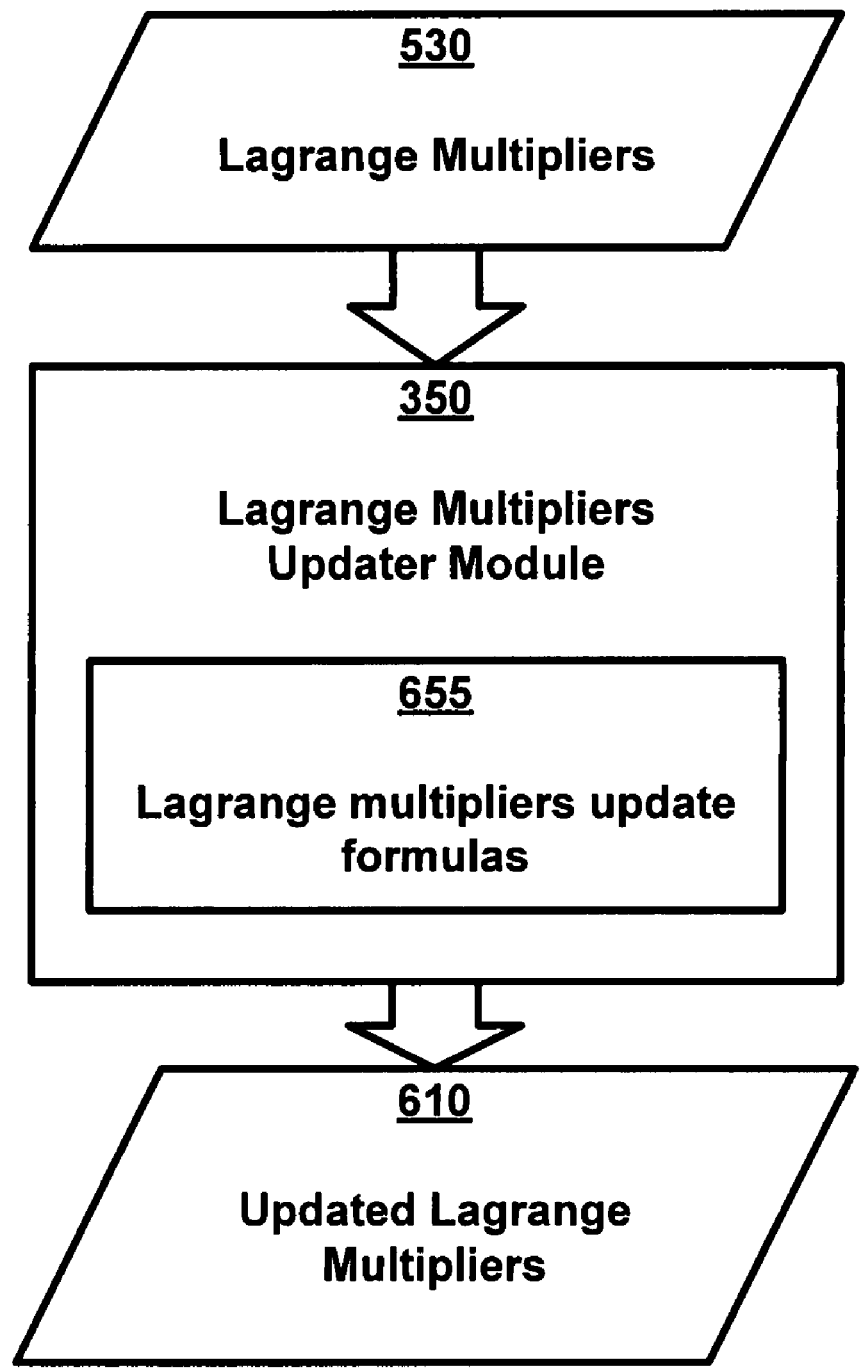
FIG. 6 is a block diagram of a Lagrange multipliers updater module as per an aspect of an embodiment of the present invention.

FIG. 6 is a block diagram of a Lagrange multipliers updater module 350 as per an aspect of an embodiment of the present invention. The Lagrange multipliers updater module 350 is preferably configured to calculate updated Lagrange multipliers 610 $\hat{\lambda}=(\hat{\lambda}_1, \ldots, \hat{\lambda}_n)$. The Lagrange multipliers updater module 350 preferably uses Lagrange multipliers update formulas 655. The Lagrange multipliers update formulas 655 may include at least one formula that responds to inequality constraints $\hat{\lambda}_i = \lambda_i \psi'(kc_i(\hat{x}))$, i=1, \ldots, n.

Figure 7:
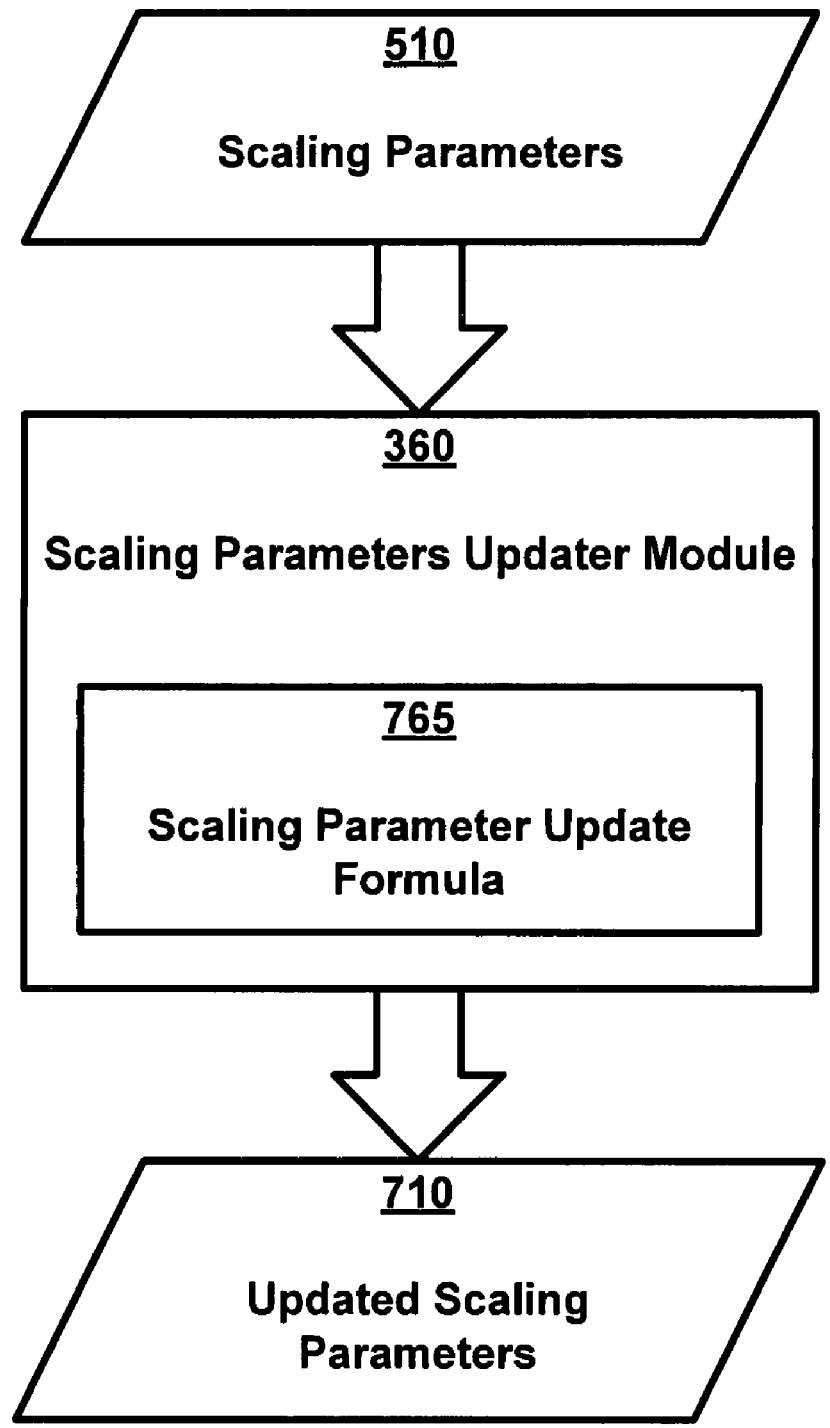
FIG. 7 is a block diagram of a scaling parameters updater module as per an aspect of an embodiment of the present invention.

FIG. 7 is a block diagram of a scaling parameters updater module 360 as per an aspect of an embodiment of the present invention. The scaling parameters updater module 360 is preferably configured to calculate updated scaling parameters 710 $\hat{\gamma}, \hat{\tau}, \hat{k}$. The scaling parameters updater module 360 may use scaling parameter update formula 765 $\hat{k}=k\theta$, $\theta \geq 1$. Some embodiments of the scaling parameters updater module 360 may use scaling parameter update formula 765

$$\hat{\tau} = \sum_{i \in I_-} \hat{\lambda}_i + \sum_{i \in I_-} \hat{\lambda}_i.$$

Updating may involve finding a new value without using the old value. For example, the scaling parameters updater module 360 may update $\hat{\gamma}$ such that $\|\hat{w}\|^2 = 1$, where $$\hat{w} = \hat{\gamma}^{-1} \left( \sum_{i \in I_+} \hat{\lambda}_i a_i - \sum_{i \in I_-} \hat{\lambda}_i a_i \right).$$

Figure 8:
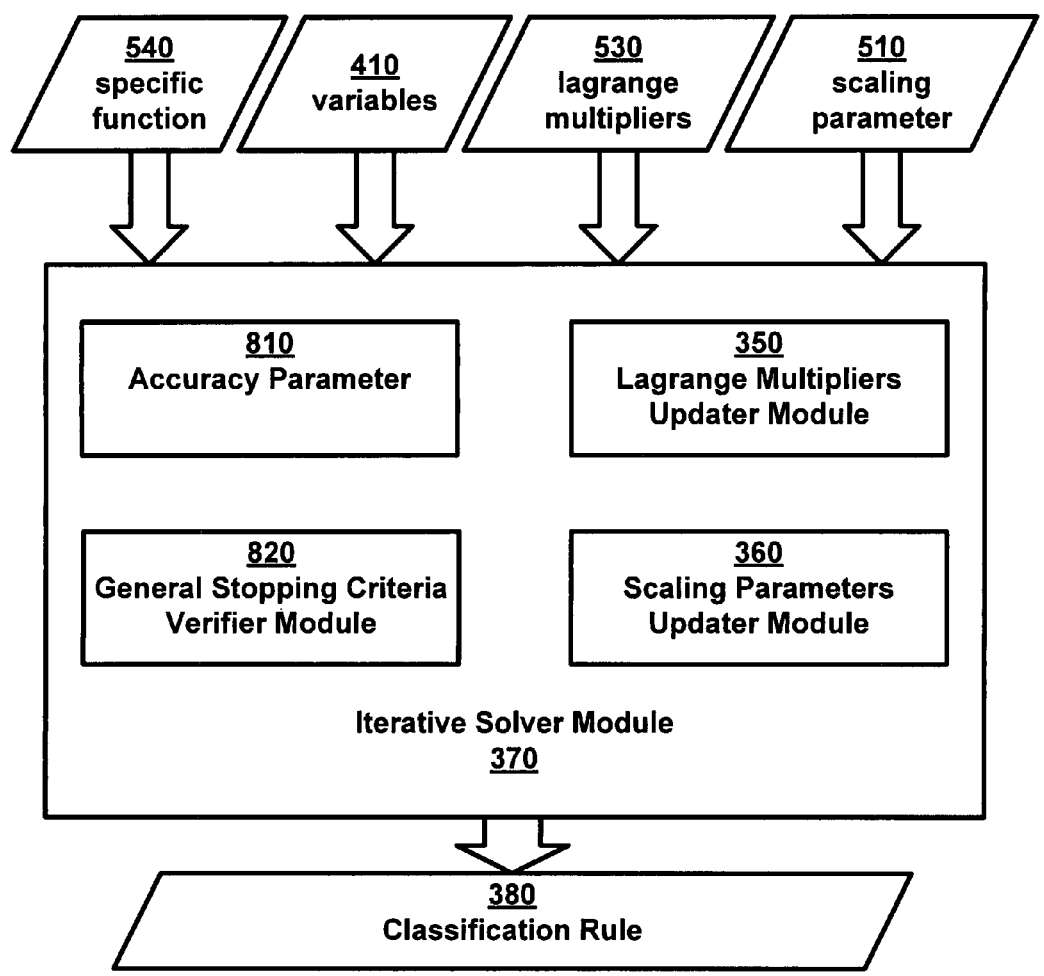
FIG. 8 is a block diagram of an iterative solver module as per an aspect of an embodiment of the present invention.
Figure 9:
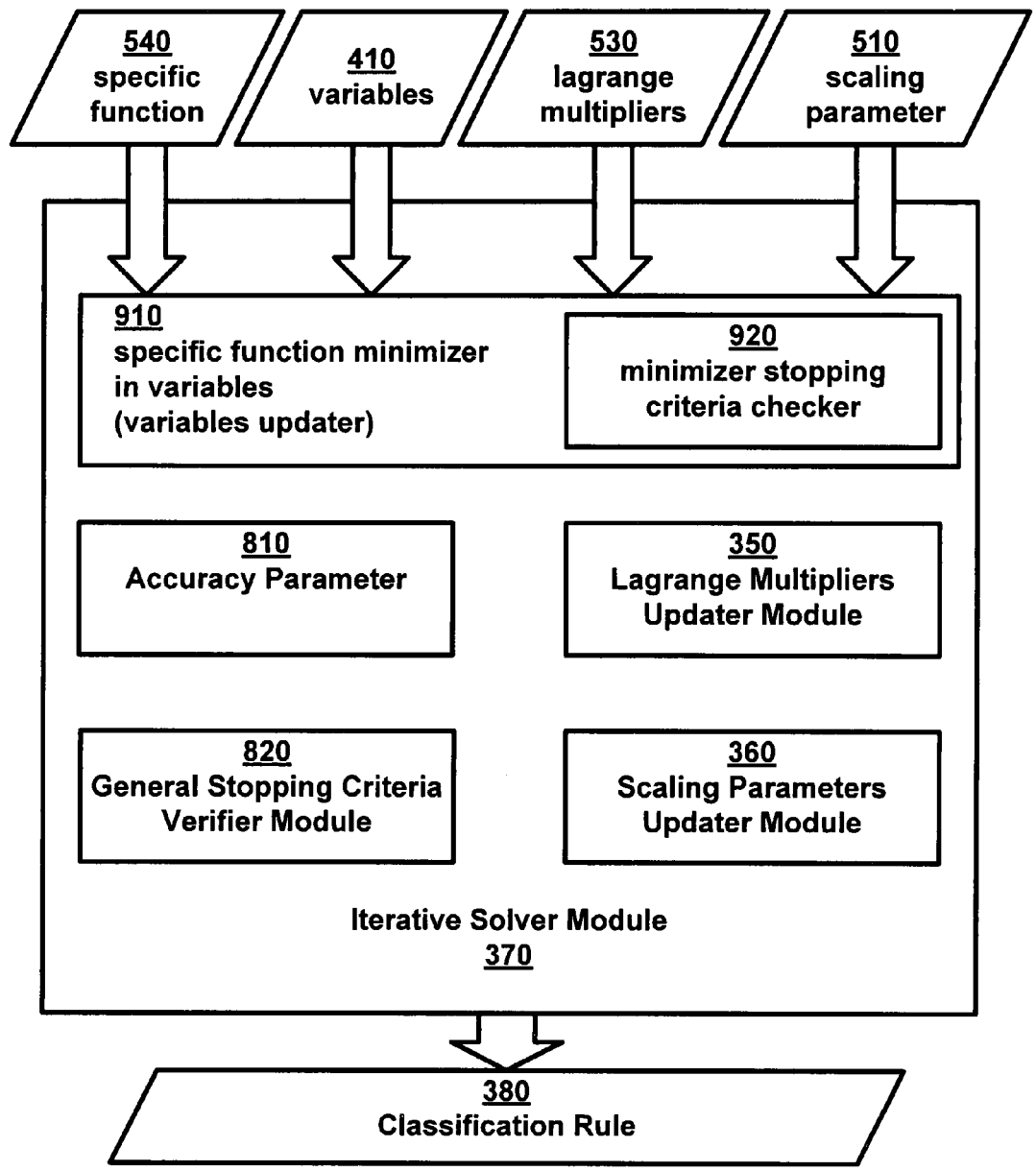
FIG. 9 is a block diagram of another iterative solver module as per an aspect of an embodiment of the present invention.

FIG. 8 and FIG. 9 are each a block diagram of an example embodiment of an iterative solver module 370 as per an aspect of an embodiment of the present invention. The iterative solver module 370 is preferably configured to generate a classification rule 380 using: the specific function 540; the Lagrange multipliers updater module 350; the scaling parameters updater module 360; the general stopping criteria verifier module 820; and an accuracy parameter 810 (ε).

The iterative solver module 370 may use a general stopping criteria verifier module 820 for determining when the iterative solver module 370 should terminate. This process may use a general stopping criteria. The general stopping criteria verifier module 820 may use the accuracy parameter 810. The general stopping criteria verifier module 820 may consider when $\|\lambda - \hat{\lambda}\| \leq \epsilon$.

Further, in some embodiments, the iterative solver module 370 may be a MIN_UPDATE solver module as shown in FIG. 9. The MIN_UPDATE solver module may use a specific function minimizer module 910, a minimizer stopping criteria checker 920, the Lagrange multipliers updater module 350, the scaling parameters updater module 360, and the general stopping criteria verifier module 820. The specific function minimizer module 910 preferably performs an unconstrained minimization in variables of the specific function 540 with determined Lagrange multipliers 530 and scaling parameters 510. The specific function minimizer module 910 is preferably configured to produce updated variables. The minimizer stopping criteria checker 920 preferably determines when the specific function minimizer 910 should terminate. The Lagrange multipliers updater module 350 preferably calculates the updated Lagrange multipliers using the updated variables, the Lagrange multipliers and the Lagrange multipliers update formula. The scaling parameters updater module 360 preferably calculates the updated scaling parameters using the updated variables, the updated Lagrange multipliers, the scaling parameters and the scaling parameters update formula. The specific function minimizer module 910 may use a Newton's method. The MIN_UPDATE solver module and the minimizer stopping criteria may use the accuracy of minimizer parameter ($\epsilon_m$). The updated variables ($\hat{x}$) should satisfy the minimizer stopping criteria. The minimizer stopping criteria checker 920 may use at least one of the following: the updated variables; the Lagrange multipliers 530; the scaling parameter 510; the updated Lagrange multipliers; and/or a stopping inequality verifier. The stopping inequality verifier may be selected such that $\hat{x}: \|\nabla_x L(\hat{x}, \lambda, \gamma, \tau, k)\| \leq \epsilon_m$.

Figure 10:
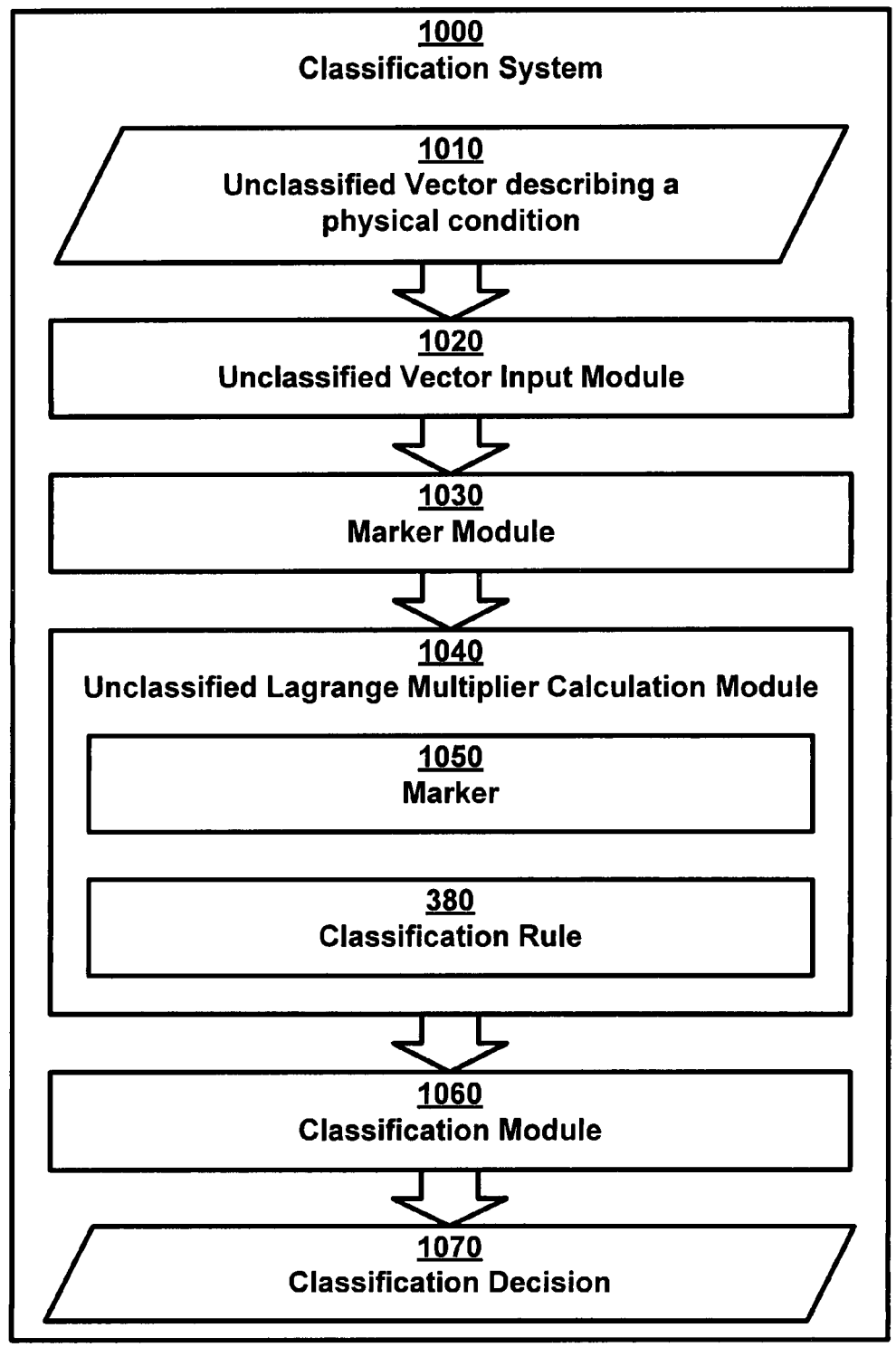
FIG. 10 is a block diagram of a classification system as per an aspect of an embodiment of the present invention.

FIG. 10 is a block diagram of a classification system 1000 as per an aspect of an embodiment of the present invention.

The classification system 1000 may include a first input module 1020, a marker module 1030, unclassified Lagrange multiplier calculation module 1040, and a classification module 1060. The first input module 1020 is preferably configured to receive an unclassified vector 1010 that describes a physical condition. The marker module 1030 is preferably configured to assign a marker to the unclassified vector 1010. The marker should place the unclassified vector 1010 into one of two classes.

The unclassified Lagrange multiplier calculation module 1040 is preferably configured to calculate an classifying Lagrange multiplier for the unclassified vector 1010 using the marker and a classification rule 380. The classification rule 380 is preferably configured to distinguish between the two classes. The classification rule 380 may be generated using a training system for classifying the physical condition. The classification module 1060 is preferably configured to determine that the marker 1050 places the unclassified vector 1010 in the proper class if the classifying Lagrange multiplier is small.

Figure 11:
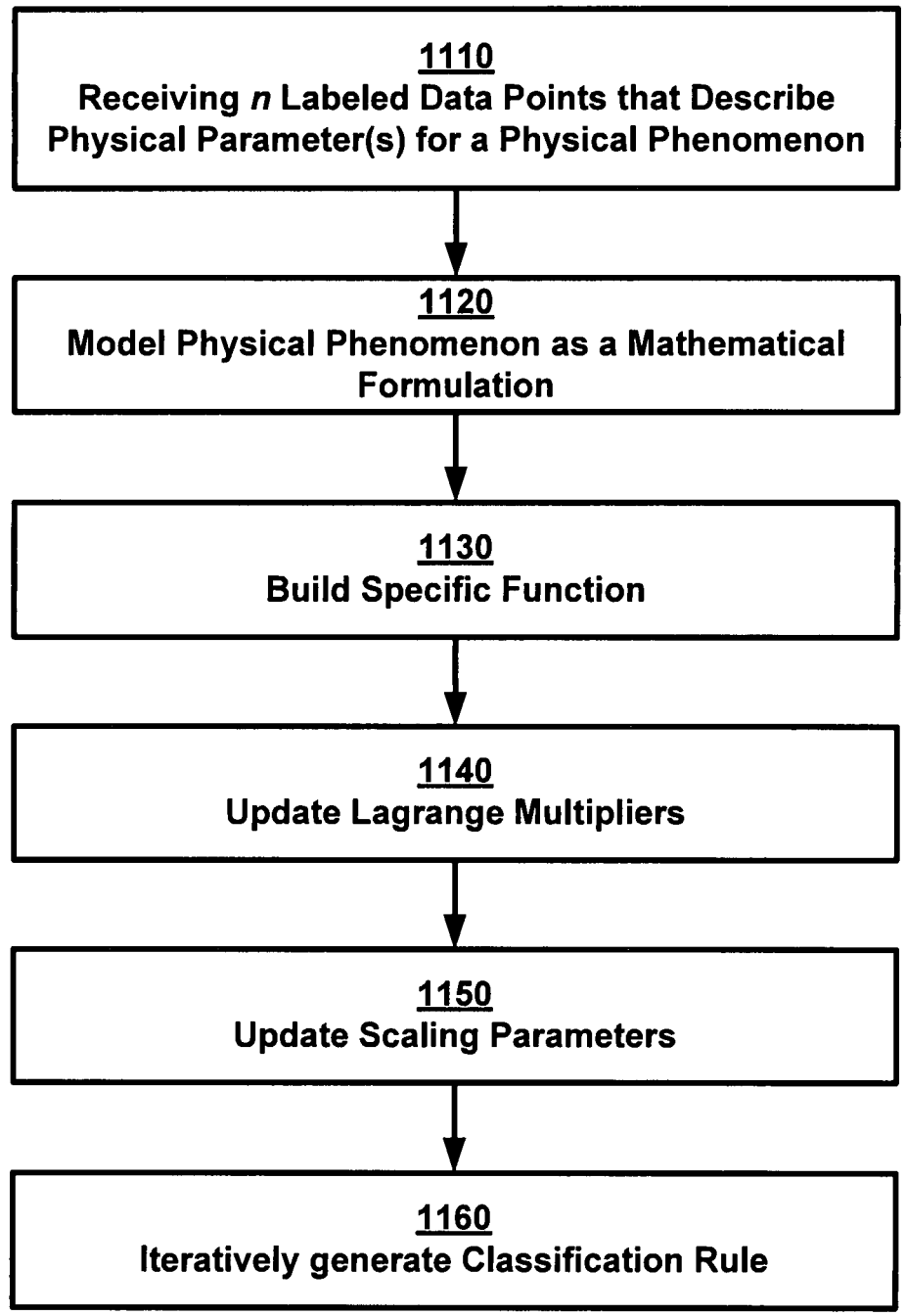
FIG. 11 is a flow diagram of a training method as per an aspect of an embodiment of the present invention.

FIG. 11 is a flow diagram of a training method for generating a classification rule 380 as per an aspect of an embodiment of the present invention. At 1110, n labeled data points $\{(a_1, y_1), \ldots, (a_n, y_n)\}$ may be received. At least one of the n labeled data points should describe a physical parameter for a physical phenomenon. The n labeled data points may include vectors $a_i \in \Re^m$ and markers $y_i \in \{-1,1\}$. Each of the n labeled data points should be placed in one of two sets $I_+=\{i:(a_i,1)\}$ and $I_-=\{i:(a_i,-1)\}$.

A physical phenomenon may be modeled as a mathematical formulation using the n labeled data points at 1120. The mathematical formulation may include: variables $x=(w,b,\Delta)$, where $w \in \Re^m$, $b \in \Re^1$, $\Delta \in \Re^1$; an objective function $f(x)=\Delta$; and a plurality of constraints. The plurality of constraints may include: $c_i(x) \equiv c_i(w,b,\Delta)=(w,a_i)-b-\Delta \geq 0, i \in I_+$; $c_i(x) \equiv c_i(w,b,\Delta)=-(w,a_i)+b-\Delta \geq 0, i \in I_-$; and $\|w\|^2=1$.

A specific function $L(w,b,\Delta,\lambda,\gamma,\tau)$ may be built at 1130 using: the mathematical formulation; Lagrange multipliers $\lambda=(\lambda_1, \ldots, \lambda_n)$; scaling parameters $\gamma, \tau, k$; a class of transformation functions with a predefined set of properties; and the n labeled data points. The n labeled data points may further include a nonlinear resealing part. Updated Lagrange multipliers $\hat{\lambda}=(\hat{\lambda}_1, \ldots, \hat{\lambda}_n)$ may be calculated at 1140. Scaling parameters $\hat{\gamma}, \hat{\tau}, \hat{k}$ may be updated at 1150. A classification rule 380 may be generated iteratively at 1160 using: the specific function; the Lagrange multipliers updater module; the scaling parameters updater module; a general stopping criteria verifier module; and an accuracy parameter ($\epsilon$).

Figure 12:
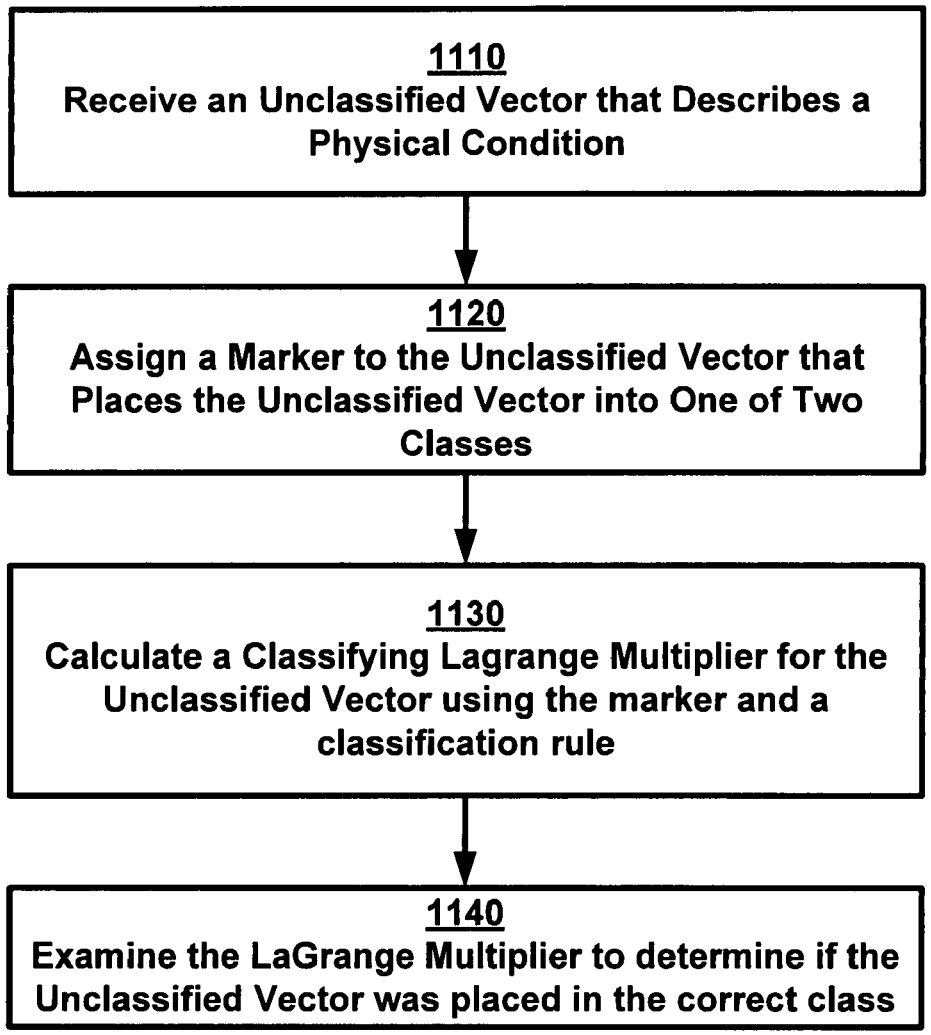
FIG. 12 is a flow diagram of a classification method as per an aspect of an embodiment of the present invention.

FIG. 12 is a flow diagram of a method for classifying an unclassified vector as per an aspect of an embodiment of the present invention. An unclassified vector that describes a physical condition may be received at 1110. A marker may be assigned to the unclassified vector at 1120. The marker should place the unclassified vector into one of two classes;

A classifying Lagrange multiplier may be calculated for the unclassified vector using: the marker; and a classification rule at 1130. The classification rule is preferably configured to distinguish between the two classes and may have been generated using a training method. At 1140, a determination may be made that the marker places the unclassified vector in the proper class if the classifying Lagrange multiplier is small.

The following publically available references are listed to assist the reader (and in particular, those less skilled in the current art) in understanding the present disclosure.

[1] Blake, C. L. & Merz, C. J. (1998). UCI Repository of machine learning databases, http://www.ics.uci. edu/~mlearn/MLRepository.html, University of California, Irvine, Dept. of Information and Computer Sciences.

[2] Boser, B. E., Guyon, I., & Vapnik, V. (1992). A training algorithm for optimal margin classifiers. COLT (pp. 144-152).

[3] Burges, C. J. C. (1996). Simplified support vector decision rules. ICML (pp. 71-77).

[4] Chang, C.-C., & Lin, C.-J. (2001). Libsvm: a library for support vector machines.

[5] Cortes, C., & Vapnik, V. (1995). Support-vector networks. Machine Learning, 20, 273-297.

[6] Guyon, I., Matic, N., & Vapnik, V. (1996). Discovering informative patterns and data cleaning. In Advances in knowledge discovery and data mining, 181-203.

[7] Jensen, D., & Polyak, R. (1994). The convergence of a modified barrier method for convex programming. IBM Journal of Research and Development, 38, 307-321.

[8] Melman, A. & Polyak, R. (1996). The Newton modified barrier method for QP problems. Annals of Operations Research, 62, 465-519.

[9] Nesterov, Y., & Nemirovskii, A. (1994). Interior-point polynomial algorithms in convex programming. Philadelphia: Society for Industrial and Applied Mathematics.

[10] Nguyen, D., & Ho, T. B. (2005). An efficient method for simplifying support vector machine. Proc. 22nd Int. Conf on Machine Learning, 617-624.

[11] Polyak, R. (1992). Modified barrier functions (theory and methods). Math. Program., 54, 177-222.

[12] Polyak, R. (2002). Nonlinear resealing vs smoothing technique in convex optimization. Math. Program. Ser. A, 92, 197-235.

[13] Polyak, R., & Griva, I. (2004). Primal-Dual Nonlinear Rescaling Method for Convex Optimization Journal of Optimization Theory and Applications, Vol 122, No 1, 111-156.

[14] Polyak, R., & Teboulle, M. (1997). Nonlinear resealing and proximal-like methods in convex optimization. Math. Program, 76, 265-284.

[15] Rätsch, G., Onoda, T., & Müller, K.-R. (2001). Soft margins for adaboost. Machine Learning, 42, 287-320.

[16] Vapnik, V. N. (2000) The nature of statistical learning theory, Springer. 2nd edition.

[17] Wu, M., Scholkopf, B., & Bakir, G. (2006). A Direct Method for Building Sparse Kernel Learning Algorithms, Journal of Machine Learning Research, Vol. 7, 603-624.

Below are copies of matlab code for the purpose of showing how aspects of embodiments of the present invention may be implemented.

Nrsvm.m: Main module for implementing an NR-SVM.

```
function [t_error_A, t_error, lambda_A, delta] = nrsvm(data, label, sz)
lambda_A = [ ];
t_error = [ ];
t_error_A =[ ];
global kappa K lambda x y s_lam;
x = data;
y = label';
tr = [x y'];
% Nonlinear Rescaling Method
[r,c] = size(x);
kappa=10;
epsilon = 0.05;
lambda = ones(1,r);
s_lam = sum(lambda);
K = kappa*ones(1,r);
x0 = [zeros(1, c) 0 1];
A = [ ]; B = [ ];
options = optimset('Display','off','LargeScale','off','TolX',
1e-18,'TolFun',1e-18);
```

-continued

```
% show progress after each iteration
for i = 1:40,
    ww = fmincon('psvm',x0,A,B,[ ],[ ],[ ],[ ],'nonlcon1',options);
    w = ww(1,1:c);
    b = ww(1,c+1);
    delta = ww(1,c+2)
    % update lambda
    old_lambda = lambda;
    for k = 1:r,
        t = kappa*(y(k)*(w*x(k,:)' - b) - delta);
        if t > -1/2,
            lambda(k) = lambda(k)/((kappa*(y(k)*(w*x(k,:)'- b) - delta))+1);
        else
            lambda(k) = -4*kappa*lambda(k)*(y(k)*(w*x(k,:)'- b) - delta);
        end;
    end;
    lambda_A = [lambda_A lambda'];
    % check
    wlam = (y.*lambda)*x;
    wlam = wlam/norm(wlam);
    if sign(wlam(1)'/w(1)') == -1,
        wlam = -wlam
        sgn = -1;
    else
        sgn = 1;
    end;
    x0 = ww;
    s_lam = sum(lambda);
    Id = max(abs(lambda-old_lambda));
    if Id < epsilon,
        disp(Id);
        disp(i);
        disp([w' wlam' ((y.*lambda)*x)'./w'])
        break;
    end;
    disp(Id);
end
j = r;
wn = wlam/norm(wlam);
%%%%%%%%%%%%%%%%%%%%%%%%%%%%%%%%%%%%%%%%
% training error
output = wn*tr(:,1:c)'- b;
result = sign(output);
outcome = result - tr(:,c+1)';
outcome = (outcome ~= 0);
ss = sum(outcome);
e = ss/r % error rate;
t_error = [t_error e];
% percentage of positive examples that are not corrected
outcome_A = result(1,1:209) - tr(1:209,c+1)';
outcome_A = (outcome_A ~= 0);
ss_A = sum(outcome_A);
e_A = ss_A/sz
t_error_A = [t_error_A e_A];
```

Psvm.m: This routine is an objective function to solve the SVM problem using a Nonlinear Rescaling method. (use in nrsvm.m)

```
function f = psvm(arg)
global kappa K lambda x y s_lam;
[r,c] = size(x);
w = arg(1,1:c);
b = arg(1,c+1);
delta = arg(1,c+2);
f = -delta;
for i = 1:r,
    t = kappa*(y(i)*(w*x(i,:)' - b) - delta);
    if t >= -0.5,
        f = f - (lambda(i)*log(kappa*(y(i)*(w*x(i,:)'- b) - delta) +
            1))/(kappa*s_lam);
    else
        f = f - (lambda(i)*(-2*(kappa*(y(i)*(w*x(i,:)'- b) - delta))^2 -
            log(2) + 1/2))/(kappa*s_lam);
    end;
end;
```

Nonlcon1.m: constraints for the SVM problem using Nonlinear Rescaling method. (use in nrsvm.m)

```
function [c, ce] = nonlcon1(arg)
global x;
[rr,cc] =size(x);
c = [ ];
ce = norm(arg(1,1:cc))-1;
```

Experiment2.m: The code to compute confidence score based on NR-SVM for identification and prioritization of drug targets. (use nrsvm.m)

```
L = [ ];
IN = [ ];
rkp = [ ];
rkn = [ ];
rkt = [ ];
``` load processed_drugcard hpositive hpositive_label positive positive_label bpositive bpositive_label negative negative_label; load edata ehpositive ehpositive_label epositive epositive_label

```
% 209 ; 208; 1;
for i = 1:100,
    index = randperm(12372);
    for j = 65:69,
        data = [epositive(:,3:22); negative(index(1:208), 3:22);
            bpositive(j,3:22)];
        label = [ones(209,1); -1*ones(209,1)]; %negative
        [t_error_A_n, t_error_n, lambda_A,
            delta] = nrsvm(data, label, 209);
        [r,c] = size(lambda_A);
        [I, Y] = sort(lambda_A(:,c));
        L = Y; IN = I;
        %if tr_error_p < 0.35,
        AA = (L > 209);
        B = [AA L IN];
        C = [flipud([1:209]') B(B(:,1) == 1,2:3)];
        T = C(C(:,2)>417,1);
        LMn = C(C(:,2)>417,3);
        rkn = T;
        %end;
        label = [ones(209,1); -1*ones(208,1); 1]; %positive
        [t_error_A_p, t_error_p, lambda_A,
            delta] = nrsvm(data, label, 210);
        [r,c] = size(lambda_A);
        [I, Y] = sort(lambda_A(:,c));
        L = Y; IN = I;
        %if tr_error_p < 0.35,
        AA = (L > 209);
        B = [AA L IN];
        C = [flipud([1:209]') B(B(:,1) == 1,2:3)];
        T = C(C(:,2)>417,1);
        LMp = C(C(:,2)>417,3);
        rkp = T;
        %end;
        rk = [rkp LMp t_error_A_p t_error_p rkn
            LMn t_error_A_n t_error_n]
        rkt = [rkt; rk]
        save rk_data_negative rkt;
    end;
end;
```

While various embodiments of the present invention have been described above, it should be understood that they have been presented by way of example, and not limitation. It will be apparent to persons skilled in the relevant art that various changes in form and detail can be made therein without departing from the spirit and scope of the present invention. In fact, after reading the above description, it will be apparent to one skilled in the relevant art how to implement the invention in alternative embodiments. Thus, the present invention should not be limited by any of the above described exemplary embodiments.

In addition, it should be understood that any figures, schematic diagrams, system diagrams, or examples which highlight the functionality and advantages of the present invention, are presented for example purposes only. The architecture of the present invention is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Furthermore, it is the applicant's intent that only claims that include the express language means for or step for be interpreted under 35 U.S.C. 112, paragraph 6. Claims that do not expressly include the phrase means for or step for are not to be interpreted under 35 U.S.C. 112, paragraph 6.

The present invention can be made from a variety of materials, in a variety of shape and size, for a variety of purpose. The scope of the present invention is limited only by the claims as follows.

The invention claimed is:

1. A training system for classifying a physical condition, the system comprising:
   a) an input module configured to receive n labeled data points $\{(a_1, y_1), \ldots, (a_n, y_n)\}$, at least one of said n labeled data points describing at least one physical parameter for a physical phenomenon, said n labeled data points including vectors $a_i \in \Re^m$ and markers $y_i \in \{-1,1\}$, each of said n labeled data points placed in one of two sets $I_+=\{i:(a_i,1)\}$ and $I_-=\{i:(a_i,-1)\}$;
   b) a mathematical formulation module configured to use said n labeled data points to model said physical phenomenon as a mathematical formulation, said mathematical formulation including:
      i) variables $x=(w,b,\Delta)$, where $w \in \Re^m$, $b \in \Re^1$, $\Delta \in \Re^1$;
      ii) an objective function $f(x)=\Delta$; and
      iii) a plurality of constraints, said plurality of constraints including:

$$c_i(x) \equiv c_i(w,b,\Delta) = (w,a_i) - b - \Delta \geq 0, i \in I_+; \quad (1)$$

$$c_i(x) \equiv c_i(w,b,\Delta) = -(w,a_i) + b - \Delta \geq 0, i \in I_-; \text{ and} \quad (2)$$

$$\|w\|^2 = 1; \quad (3)$$

c) a transformer module configured to build a specific function $L(w,b,\Delta,\lambda,\gamma,\tau)$ using:
      i) said mathematical formulation;
      ii) Lagrange multipliers $\lambda=(\lambda_1, \ldots, \lambda_n)$;
      iii) scaling parameters $\gamma, \tau, k$;
      iv) a class of transformation functions with a predefined set of properties; and
      v) said n labeled data points, said n labeled data points further including a nonlinear rescaling part;
   d) a Lagrange multipliers updater module configured to calculate updated Lagrange multipliers $\hat{\lambda}=(\hat{\lambda}_1, \ldots, \hat{\lambda}_n)$;
   e) a scaling parameters updater module configured to calculate updated scaling parameters $\hat{\gamma}, \hat{\tau}, \hat{k}$; and
   f) an iterative solver module configured to generate a classification rule using:
      i) said specific function;
      ii) said Lagrange multipliers updater module;
      iii) said scaling parameters updater module;
      iv) a general stopping criteria verifier module; and
      v) an accuracy parameter ($\epsilon$).

2. A system according to claim 1, wherein said predefined set of properties includes:
   i) $\psi(t): \Re^1 \to \Re^1$ defined on $-\infty \leq a < t < b \leq \infty$;
   ii) $\psi(0)=0$;
   iii) $\psi'(0)=1$;
   iv) $\psi'(t)>0$;
   v) $\psi''(t)<0$; and vi) $\lim_{t \to b} \psi'(t) = 0$.

3. A system according to claim 2, wherein said predefined set of properties further includes:
   i) $\psi'''(t)>0$; and ii) $\lim_{t \to a} \psi'(t) = 0$.

4. A system according to claim 1, wherein said mathematical formulation includes said objective function being optimized subject to at least said plurality of constraints.

5. A system according to claim 1, wherein said specific function includes:

$$-\tau\Delta - k^{-1}\sum_{i \in I_+} \lambda_i \psi(kc_i(x)) - k^{-1}\sum_{i \in I_-} \lambda_i \psi(kc_i(x)) + \gamma\frac{1}{2}(\|w\|^2 - 1).$$

6. A system according to claim 1, wherein said nonlinear rescaling part includes at least:

$$k^{-1}\sum_{i \in I_+} \lambda_i \psi(kc_i(x)); \text{ or}$$

$$k^{-1}\sum_{i \in I_-} \lambda_i \psi(kc_i(x)).$$

7. A system according to claim 1, wherein said Lagrange multipliers updater module uses Lagrange multipliers update formulas.

8. A system according to claim 7, wherein said Lagrange multipliers update formulas include at least one formula that responds to inequality constraints $\hat{\lambda}_i = \lambda_i \psi'(kc_i(\hat{x}))$, $i=1,\ldots,n$.

9. A system according to claim 1, wherein said scaling parameters updater module uses scaling parameter update formula $\hat{k}=k\theta$, $\theta \geq 1$.

10. A system according to claim 1, wherein said scaling parameters updater module uses scaling parameter update formula $$\hat{\tau} = \sum_{i \in I_+} \hat{\lambda}_i + \sum_{i \in I_-} \hat{\lambda}_i.$$

11. A system according to claim 1, wherein said scaling parameters updater module updates $\hat{\gamma}$ such that $\|\hat{w}\|^2 = 1$, where $$\hat{w} = \hat{\gamma}^{-1} \left( \sum_{i \in I_+} \hat{\lambda}_i a_i - \sum_{i \in I_-} \hat{\lambda}_i a_i \right).$$

12. A system according to claim 1, wherein said iterative solver module uses a general stopping criteria verifier module for determining when said iterative solver should terminate.

13. A system according to claim 1, wherein said iterative solver module uses a general stopping criteria.

14. A system according to claim 1, wherein said general stopping criteria verifier module uses said accuracy parameter.

15. A system according to claim 14, wherein said general stopping criteria verifier module considers when $\|\lambda - \hat{\lambda}\| \leq \epsilon$.

16. A system according to claim 1, wherein said iterative solver module is a MIN_UPDATE solver module.

17. A system according to claim 16, wherein said MIN_UPDATE solver module uses:
   a) a specific function minimizer module for performing an unconstrained minimization in variables of said specific function with determined said Lagrange multipliers and said scaling parameters; said specific function minimizer module is configured to produce updated variables;
   b) a minimizer stopping criteria checker for determining when said specific function minimizer should terminate;
   c) said Lagrange multipliers updater module for calculating said updated Lagrange multipliers using said updated variables, said Lagrange multipliers and said Lagrange multipliers update formula;
   d) said scaling parameters updater module for calculating said updated scaling parameters using said updated variables, said updated Lagrange multipliers, said scaling parameters and said scaling parameters update formula; and
   e) said general stopping criteria verifier module.

18. A system according to claim 17, wherein said specific function minimizer module uses a Newton's method.

19. A system according to claim 17, wherein said MIN_UPDATE solver module uses accuracy of minimizer parameter ($\epsilon_m$), and said minimizer stopping criteria uses said accuracy of minimizer parameter.

20. A system according to claim 17, wherein said updated variables ($\hat{x}$) must satisfy said minimizer stopping criteria.

21. A system according to claim 17, wherein said minimizer stopping criteria checker uses at least one of the following:
   a) said updated variables;
   b) said Lagrange multipliers;
   c) said scaling parameter;
   d) said updated Lagrange multipliers; and
   e) a stopping inequality verifier.

22. A system according to claim 21, wherein said stopping inequality verifier is selected such that $\hat{x}: \|\nabla_x L(\hat{x}, \lambda, \gamma, \tau, k)\| \leq \epsilon_m$.

23. A classification system, said classification system comprising:
   a) an first input module configured to receive an unclassified vector that describes a physical condition;
   b) a marker module configured to assign a marker to said unclassified vector, said marker module placing said unclassified vector in one of two classes;
   c) an unclassified Lagrange multiplier calculation module configured to calculate an classifying Lagrange multiplier for said unclassified vector using:
      i) said marker; and
      ii) a classification rule, said classification rule configured to distinguish between said two classes, said classification rule generated using a training system for classifying said physical condition, said training system comprising:
         (1) a second input module configured to receive n labeled data points $\{(a_1, y_1), \ldots, (a_n, y_n)\}$, at least one of said n labeled data points describing at least one physical parameter for a physical phenomenon, said n labeled data points including vectors $a_i \in \Re^m$ and markers $y_i \in \{-1, 1\}$, each of said n labeled data points placed in one of two sets $I_+ = \{i:(a_i, 1)\}$ and $I_- = \{i:(a_i, -1)\}$;
         (2) a mathematical formulation module configured to use said n labeled data points to model said physical phenomenon as a mathematical formulation, said mathematical formulation including:
            (a) variables $x = (w, b, \Delta)$, where $w \in \Re^m$, $b \in \Re^1$, $\Delta \in \Re^1$;
            (b) an objective function $f(x) = \Delta$; and
            (c) a plurality of constraints, said plurality of constraints including:

$$c_i(x) \equiv c_i(w, b, \Delta) = (w, a_i) - b - \Delta \geq 0, i \in I_+; \quad \text{(i)}$$

$$c_i(x) \equiv c_i(w, b, \Delta) = -(w, a_i) + b - \Delta \geq 0, i \in I_-; \text{ and} \quad \text{(ii)}$$

$$\|w\|^2 = 1; \quad \text{(iii)}$$

(3) a transformer module configured to build a specific function $L(w, b, \Delta, \lambda, \gamma, \tau)$ using:
            (a) said mathematical formulation;
            (b) Lagrange multipliers $\lambda = (\lambda_1, \ldots, \lambda_n)$;
            (c) scaling parameters $\gamma, \tau, k$;
            (d) a class of transformation functions with a predefined set of properties; and
            (e) said n labeled data points, said n labeled data points further including a nonlinear resealing part;
         (4) a Lagrange multipliers updater module configured to calculate updated Lagrange multipliers $\hat{\lambda} = (\hat{\lambda}_1, \ldots, \hat{\lambda}_n)$;
         (5) a scaling parameters updater module configured to calculate updated scaling parameters $\hat{\gamma}, \hat{\tau}, \hat{k}$; and
         (6) an iterative solver module configured to generate a classification rule using:
            (a) said specific function;
            (b) said Lagrange multipliers updater module;
            (c) said scaling parameters updater module;
            (d) a general stopping criteria verifier module; and
            (e) an accuracy parameter ($\epsilon$); and
   d) a classification module configured determine that said marker places said unclassified vector in the proper class if said classifying Lagrange multiplier is small.

24. A method for generating a classification rule comprising:

a) receiving n labeled data points $\{(a_1, y_1), \ldots, (a_n, y_n)\}$, at least one of said n labeled data points describing at least one physical parameter for a physical phenomenon, said n labeled data points including vectors $a_i \in \Re^m$ and markers $y_i \in \{-1,1\}$, each of said n labeled data points placed in one of two sets $I_+=\{i:(a_i,1)\}$ and $I_-=\{i:(a_i,-1)\}$;

b) modeling said physical phenomenon as a mathematical formulation using said n labeled data points, said mathematical formulation including:
  i) variables $x=(w,b,\Delta)$, where $w \in \Re^m$ $b \in \Re^1$ $\Delta \in \Re^1$;
  ii) an objective function $f(x)=\Delta$; and
  iii) a plurality of constraints, said plurality of constraints including:

$$c_i(x) \equiv c_i(w,b,\Delta) = (w,a_i) - b - \Delta \geq 0, i \in I_+; \quad (1)$$

$$c_i(x) \equiv c_i(w,b,\Delta) = -(w,a_i) + b - \Delta \geq 0, i \in I_-; \text{ and} \quad (2)$$

$$\|w\|^2 = 1; \quad (3)$$

c) building a specific function $L(w,b,\Delta,\lambda,\gamma,\tau)$ using:
  i) said mathematical formulation;
  ii) Lagrange multipliers $\lambda=(\lambda_1, \ldots, \lambda_n)$;
  iii) scaling parameters $\gamma, \tau, k$;
  iv) a class of transformation functions with a predefined set of properties; and
  v) said n labeled data points, said n labeled data points further including a nonlinear rescaling part;

d) calculating updated Lagrange multipliers $\hat{\lambda}=(\hat{\lambda}_1, \ldots, \hat{\lambda}_n)$;

e) calculating updated scaling parameters $\hat{\gamma}, \hat{\tau}, \hat{k}$; and f) iteratively generating a classification rule using:
  i) said specific function;
  ii) said Lagrange multipliers updater module;
  iii) said scaling parameters updater module;
  iv) a general stopping criteria verifier module; and
  v) an accuracy parameter ($\epsilon$).

25. A method classifying an unclassified vector, the method comprising:

a) assigning a marker to said unclassified vector, said marker placing said unclassified vector in one of two classes;

b) calculating a classifying Lagrange multiplier for said unclassified vector using:
  i) said marker; and
  ii) a classification rule, said classification rule configured to distinguish between said two classes, said classification rule generated using a training method, said training method comprising:

(1) receiving n labeled data points $\{(a_1, y_1), \ldots, (a_n, y_n)\}$, at least one of said n labeled data points describing a physical parameter for a physical phenomenon, said n labeled data points including vectors $a_i \in \Re^m$ and markers $y_i \in \{-1,1\}$, each of said n labeled data points placed in one of two sets $I_+=\{i:(a_i,1)\}$ and $I_-=\{i:(a_i,-1)\}$;

(2) modeling said physical phenomenon as a mathematical formulation using said n labeled data points, said mathematical formulation including:
    (a) variables $x=(w,b,\Delta)$, where $w \in \Re^m$, $b \in \Re^1$, $\Delta \in \Re^1$;
    (b) an objective function $f(x)=\Delta$; and
    (c) a plurality of constraints, said plurality of constraints including:

$$c_i(x) \equiv c_i(w,b,\Delta) = (w,a_i) - b - \Delta \geq 0, i \in I_+; \quad (i)$$

$$c_i(x) \equiv c_i(w,b,\Delta) = -(w,a_i) + b - \Delta \geq 0, i \in I_-; \text{ and} \quad (ii)$$

$$\|w\|^2 = 1; \quad (iii)$$

(3) Building a specific function $L(w,b,\Delta,\lambda,\gamma,\tau)$ using:
    (a) said mathematical formulation;
    (b) Lagrange multipliers $\lambda=(\lambda_1, \ldots, \lambda_n)$;
    (c) scaling parameters $\gamma, \tau, k$;
    (d) a class of transformation functions with a predefined set of properties; and
    (e) said n labeled data points, said n labeled data points further including a nonlinear rescaling part;

(4) calculating updated Lagrange multipliers $\hat{\lambda}=(\hat{\lambda}_1, \ldots, \hat{\lambda}_n)$;

(5) calculating updated scaling parameters $\hat{\gamma}, \hat{\tau}, \hat{k}$; and (6) iteratively generating a classification rule using:
    (a) said specific function;
    (b) said Lagrange multipliers updater module;
    (c) said scaling parameters updater module;
    (d) a general stopping criteria verifier module; and
    (e) an accuracy parameter ($\epsilon$); and c) determining that said marker places said unclassified vector in the proper class if said classifying Lagrange multiplier is small.

\* \* \* \* \*